United States Patent [19]
Hedrick

[11] 3,735,341
[45] May 22, 1973

[54] ALTITUDE ALERTING APPARATUS
[75] Inventor: Geoffrey S. Hedrick, Katonah, N.Y.
[73] Assignee: Lear Siegler, Inc., Armonk, N.Y.
[22] Filed: Aug. 27, 1970
[21] Appl. No.: 67,543

[52] U.S. Cl. ............................................. 340/27 R
[51] Int. Cl. .............................................. G08g 5/00
[58] Field of Search ..................... 340/27 R, 26, 25; 343/112 A

[56] References Cited
UNITED STATES PATENTS

| | | | |
|---|---|---|---|
| 3,320,616 | 5/1967 | Kaufman | 343/112 A |
| 3,478,310 | 11/1969 | Cone | 340/26 |
| 3,077,557 | 2/1963 | Joline | 340/27 |
| 3,588,477 | 4/1971 | Lami | 340/25 |
| 3,624,598 | 11/1971 | Foster | 340/26 |

*Primary Examiner*—Kathleen H. Claffy
*Assistant Examiner*—Jon Bradford Leaheey
*Attorney*—Wilfred O. Schmidt and Hubbell, Cohen and Stiefel

[57] ABSTRACT

An indication of altitude variation about a preselected altitude is provided from a real-time altitude digital code information input signal in response to an altitude alert control signal which is proportional to a first pair of complementary sinusoidal functions of the altitude variation. A second pair of complementary sinusoidal functions of altitude is provided from the altitude digital input signal. The first pair of sinusoidal functions is a function of the second pair of sinusoidal functions and the preselected altitude. A digital-to-synchro conversion for the input signal is provided by means of a pair of read-only memories which have been programmed to each provide a complementary sinusoidal function of the input and a binary scaling means, such as an R–2R ladder network connected to the outputs of each of the respective memories, whereby the second pair of complementary signals is provided. Each memory has an operating state and a protection state, an output being producible only in the operating state. A source of reference potential which has a value sufficient to maintain the memories in the operating state is connected to the scaling means. A single-shot which includes an operational amplifier and a capacitive charging network for changing the input potentials to the operational amplifier to turn it on and off is included as a trigger for an alert indication in response to a particular condition of the altitude alert control signals.

32 Claims, 5 Drawing Figures

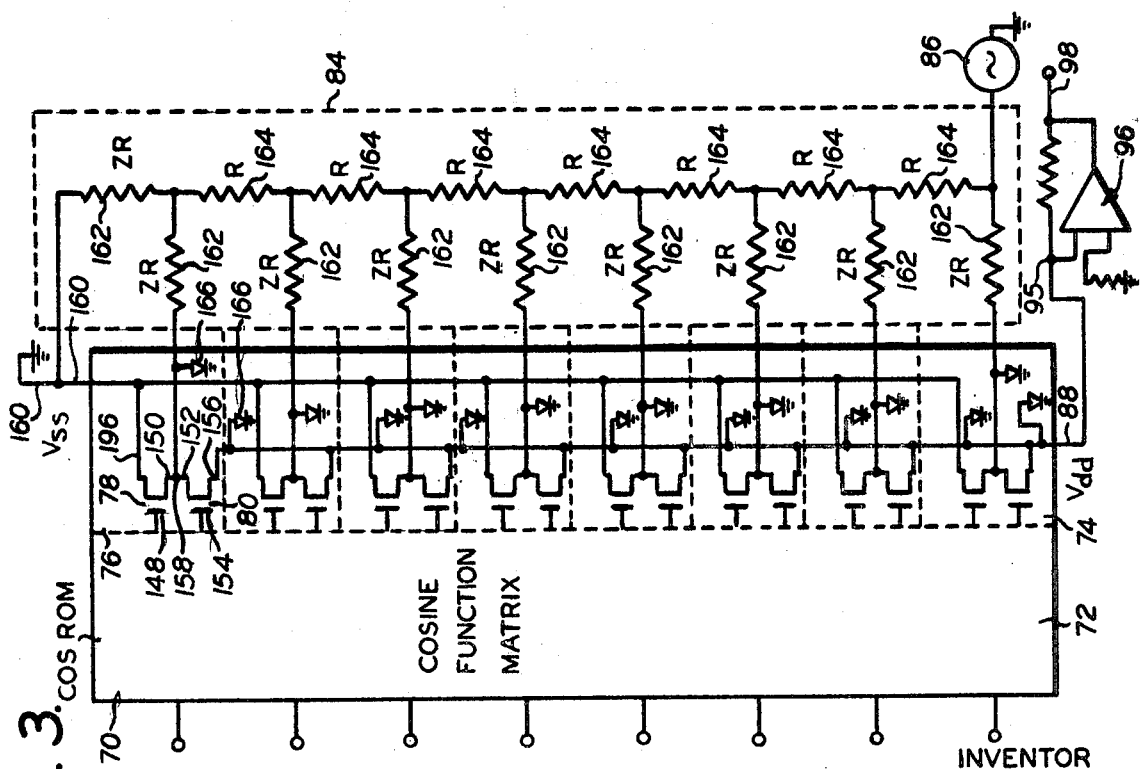

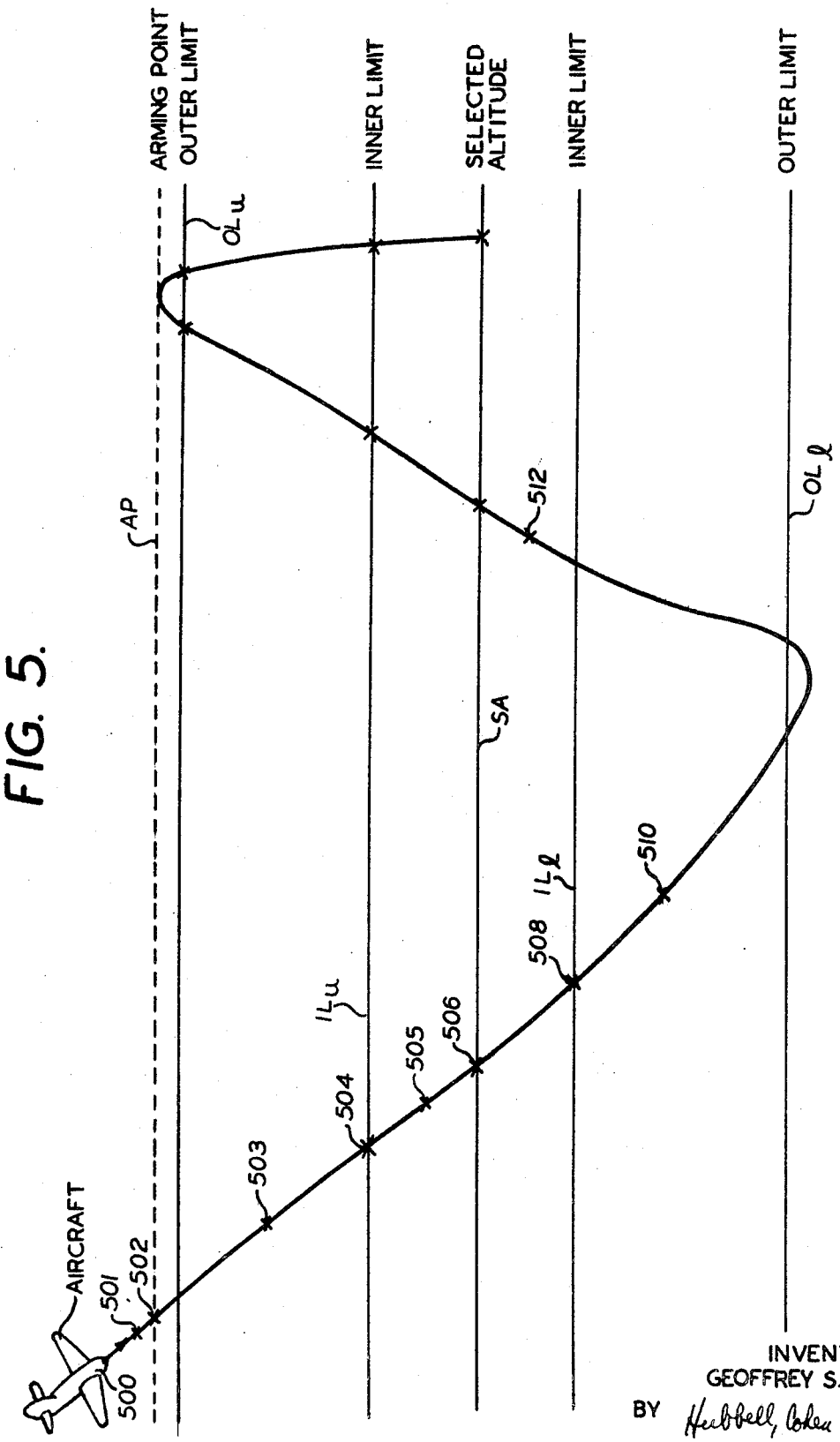

3,735,341

ALTITUDE ALERTING APPARATUS

BACKGROUND OF THE INVENTION

1. Field of the Invention

The present invention relates to altitude alerting apparatus in which an alert control signal which is proportional to a pair of complementary sinusoidal functions of altitude variation is provided from a digital input signal representative of altitude.

2. Description of the Prior Art

One of the most commonly utilized altitude reporting codes is the well known ICAO Code, which is a binary-coded decimal altitude telemetry code. This code, which is normally provided from a digital encoder aboard an aircraft, indicates the altitude of the aircraft at any given instant of time. Aircraft are normally assigned preselected altitudes by air traffic controllers and these altitudes must be maintained within a certain range or altitude envelope, in order to prevent potential air collisions. It is therefore critical for the pilot of the aircraft to know when he has deviated from his assigned altitude and is outside the altitude envelope as well as, when he is approaching a new assigned altitude, to know when he is inside the altitude envelope. With today's complicated aircraft instrument panels, an altimeter display by itself is not sufficient to alert the pilot's attention to such deviations or approaches and additional means designed for this purpose must be utilized.

The prior art altitude alerting devices, such as those utilizing a synchro-type input signal, are not capable of processing a digital input signal indicating the aircraft's present altitude, such as the commonly used ICAO code altitude reporting signal, to provide an indication of altitude variation about the assigned altitude. Furthermore, these prior art altitude alerters are subject to errors introduced by phase shift in the synchro-transmitter of the altitude information. Since one of the most commonly utilized altitude reporting codes is a digital code, such as the ICAO code, the altitude input signal must either be transformed from the digital representation or utilized in this format to provide an indication of altitude variation. The prior art altitude alerting devices are not capable of either easily accomplishing this transformation or directly utilizing such a signal, and considerable inefficiencies result in handling these type of signals.

These disadvantages are overcome by the present invention.

SUMMARY OF THE INVENTION

An altitude alerting apparatus which provides an indication of altitude variation about a preselected altitude from an altitude digital code information input signal in response to an altitude alert control signal is provided. The alerter includes means for providing a signal proportional to a first pair of complementary sinusoidal functions of the altitude variation from the altitude digital coding information signal as the alert control signal. The control signal providing means includes means for providing a second pair of complementary sinusoidal functions of altitude from the digital code information signal and means for providing the first pair of sinusoidal functions as a function of the second pair of sinusoidal functions and the preselected altitude. Means are also included for providing the indication of altitude variation in response to the occurrence of the altitude alert control signal. A digital-to-synchro conversion of the digital input signal is provided by means of a pair of read-only memories which have been programmed to each provide a complementary sinusoidal function of the input and a binary scaling means, such as an R–2R ladder network connected to the output of each of the respective memories, whereby the second pair of complementary signals is provided. Each memory has an operating state and a protection state, an output being producible only in the operating state. A source of reference potential which has a value sufficient to maintain the memories in the operating state is connected to the scaling means.

The altitude alert control signals are fed to a condition responsive logic network which provides triggering signals for indication devices in accordance with a predetermined logic sequence. The logic network includes a single-shot network which includes two input operational amplifiers having a capacitor charging network connected between the two inputs thereof. The amplifier is preferably in the ON state while the capacitor is charging and in the OFF state when the capacitor is fully charged. A pair of diode gates is connected in parallel with the charging network for controlling the application of a charging potential in the charging network. The diode gates either provide a short circuit path for the source of charging potential to prevent the charging of the capacitor in one state, or provide a parallel open circuit which enables the charging of the capacitor in the other state. The particular condition of the alert control signals fed to the diode gates determines the state thereof.

BRIEF DESCRIPTION OF THE DRAWINGS

FIG. 3 is a schematic diagram, partially in block of a portion of the electronic circuitry of FIG. 2;

FIG. 4 is a schematic diagram of another portion of the electronic circuitry of FIG. 1; and FIG. 5 is a graphical illustration used in explaining the operation of the present invention.

DETAILED DESCRIPTION OF THE PREFERRED EMBODIMENTS

Figure 1:
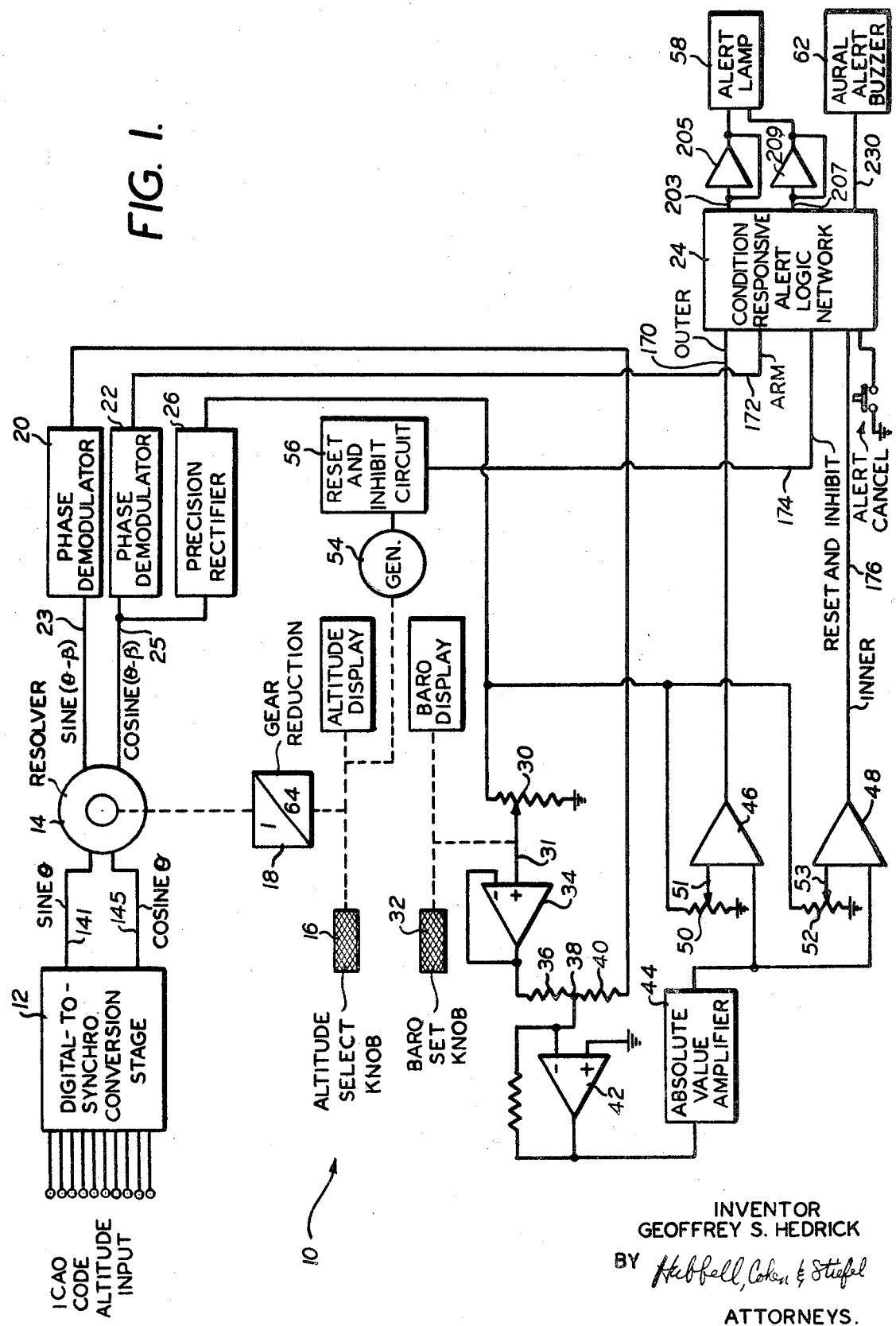
FIG. 1 is a block diagram, partially in schematic of an altitude alerter in accordance with the preferred embodiment of the present invention.

Referring now to the drawings in detail and especially to FIG. 1 thereof. The altitude alerter of the present invention, generally referred to by the reference numeral 10 includes a digital-to-synchro conversion stage 12 for preferably receiving an ICAO altitude reporting code input signal, which is a ten bit binary-coded decimal signal, and providing a pair of complementary sinusoidal output signals, sine $\theta$ and cosine $\theta$ therefrom, where $\theta$ represents the angular synchro equivalent of the digital input altitude. If desired, another type of digital input signal equivalent to altitude may be fed to the digital-to-synchro conversion stage 12, which will be described in greater detail hereinafter, to provide a synchro output therefrom in a manner to be described in greater detail hereinafter.

The output of the digital-to-synchro conversion stage 12 is connected to a conventional synchro resolver 14. The resolver 14 is differentially geared to an altitude select knob 16 by which a desired or assigned altitude is selected, through a conventional gear reduction device 18 illustratively shown as having a gear reduction ratio of 64:1, the ratio being dependent on the scale factor of the control knob 16 and resolver 14. The position of the altitude select knob 16 determines the shaft angle $\beta$ of the resolver 14 through the differential gearing connection 18. The output of the resolver 14, which is another pair of complementary sinusoids, sine $(\theta-\beta)$ and cosine $(\theta-\beta)$, is connected to a pair of phase demodulators 20 and 22, respectively, one demodulator 20 connected to the sine $(\theta-\beta)$ output 23 and the other demodulator 22 connected to the cosine $(\theta-\beta)$ output 25. The phase demodulator 22 to which the cosine function cosine $(\theta-\beta)$ is fed has its output connected to a condition responsive logic network 24 to provide an arming signal thereto in a manner to be described in greater detail hereinafter, in order to eliminate synchro signal ambiguities 180° apart due to a dual null present in a synchro. A precision rectifier 26 is connected in parallel with the phase demodulator 22 to the resolver 14 cosine $(\theta-\beta)$ output 25.

The output of the precision rectifier 26 is preferably connected to a potentiometer 30 having a wiper arm 31. The potentiometer 30 impedance, and hence output voltage, is non-linearly adjustable through a connection of the wiper arm 31 to a barometric set knob 32 which determines the barometrically corrected setting for the selected altitude in a manner to be described in greater detail hereinafter. If desired, barometric correction can be accomplished by conventional means such as by appropriately gearing the altitude select gear reduction device 18 output and the baro set knob 32 together. The output of wiper arm 31 of the potentiometer is preferably connected to the input of a unity gain buffer amplifier 34 whose output is connected through a scaling impedance 36, which reflects the altitude change the barometric potentiometer 30 is set for, to a summing junction point 38.

A scaling impedance 40, which also reflects this altitude change, is also connected between the summing junction point 38 and the output of the phase demodulator 20. The summing junction point 38 is preferably connected to the input of a high gain summing operational amplifier 42 whose output is preferably connected through a conventional absolute value amplifier 44 to one input of a pair of parallel connected two input comparators or voltage detectors 46 and 48, which are preferably high-gain amplifiers, to provide an outer alert control signal output, and an inner alert control signal output, respectively, in a manner to be described in greater detail hereinafter.

A potentiometer 50 has a wiper arm 51 output which is connected to the other input of the comparator 46 to provide an outer alert point signal reference or threshold value thereto. Similarly, another potentiometer 52 has a wiper arm 53 output which is connected to the other input of comparator 48 to provide an inner alert point signal reference or threshold value thereto. The output of the precision rectifier 26 is connected in parallel with the input to potentiometers 50 and 52 respectively. The output of comparators 46 and 48 is connected to the condition responsive logic network 24 to provide the outer and inner alert control signals thereto.

A generator 54 and reset-and-inhibit circuit 56 are preferably connected between the altitude select knob 16 and the condition responsive logic network 24 for providing an approach mode reset-and-logic transfer inhibit signal to the logic network 24 during altitude reselection in a manner to be described in greater detail hereinafter. The condition responsive alert logic network 24 preferably has its output connected in turn to an alert lamp network 58, and an aural alert buzzer 62 for providing indications of an altitude variation in a manner to be described in greater detail hereinafter.

"DIGITAL-TO-SYNCHRO CONVERSION STAGE"

Figure 2:
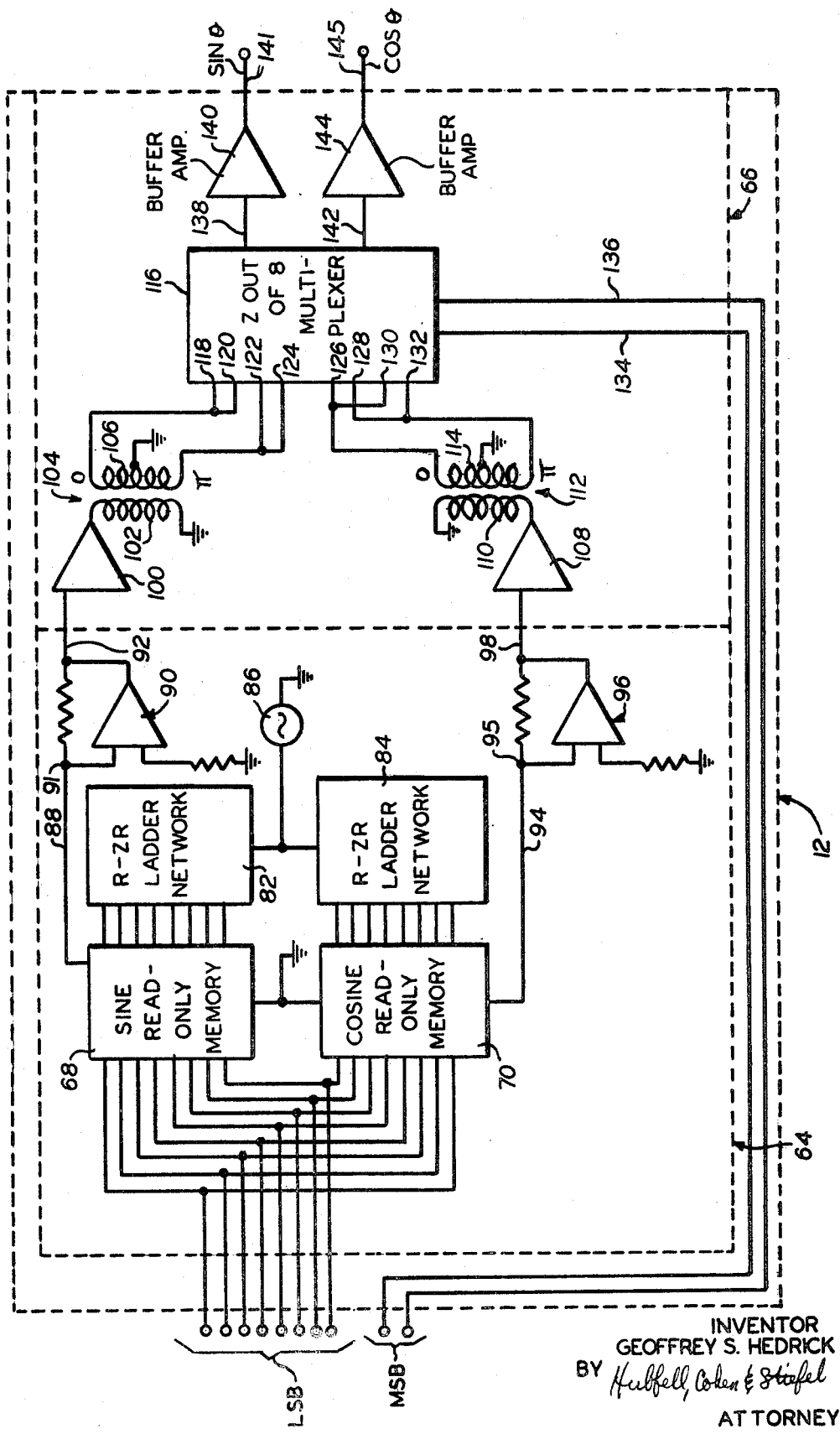
FIG. 2 is a schematic diagram, partially in block of a portion of the electronic circuitry of FIG. 1.

Referring now to FIG. 2 and describing the digital-to-synchro conversion stage 12 in greater detail. The digital-to-synchro conversion stage 12 preferably includes a digital-to-synchro quarter-cycle convertor 64 capable of providing a pair of complementary sinusoidal functions, which are preferably sine and cosine, respectively, of a representative synchro shaft angle between 0° and 90° from a digital input, and a full cycle quadrant selection portion 66 capable of providing the sine and cosine functions respectively, of a representative synchro shaft angle between 0° and 360° from the quarter-cycle shaft angle information and the quadrant selection information. Of course, if a full cycle digital signal without quadrant selection were utilized as the digital input, then, if desired, a full cycle convertor similar in principle of operation to the preferred quarter cycle converter 64, could be utilized in place thereof, in which case the quadrant selection portion 66 would be omitted. The preferred 10 bit digital input signal is preferably provided as a parallel input, one conductor per bit. As will be explained in greater detail hereinafter, preferably the eight least significant bits (LSB) of the 10 bit ICAO code provide the digital input information to the digital-to-synchro quarter-cycle conversion portion 64 whereas the two most significant bits (MSB) of the ICAO code control the quadrant selection portion 66 in a manner to be described in greater detail hereinafter.

Preferably, the digital-to-synchro quarter-cycle convertor portion 64 includes a pair of read-only memories 68 and 70, respectively, which are programmed in a conventional manner to provide a sine function of the digital input and a cosine function of the digital input, respectively. The sine read-only memory 68 and the cosine read-only memory 70 are preferably constituted by metal-oxide semi-conductor monolithic chips, which are commonly termed MOS chips. As will be explained in greater detail hereinafter by reference to FIG. 3, these MOS chips 68 and 70 each have an input portion 72 which is a preprogrammed function matrix which provides the desired sinusoidal function, and an output portion 74 which preferably comprises a plurality of bistable output sections 76, one for each binary input, each section comprising a pair of serially coupled synch-source field-effect transistors (FET) 78, 80, to be described in greater detail hereinafter. The eight least significant bit parallel digital input is coupled in parallel to eight inputs to both the sine read-only memory 68 and the cosine read-only memory 70, one input corresponding to one binary bit. The output portions 74 of both the sine read-only memory 68 and the cosine read-only memory 70 are each respectively coupled to a binary scaler, which is preferably a conventional R-2R ladder network 82 and 84. The output portions 74 (FIG. 3) of the read-only memory 68 and 70 are also coupled to ground for a purpose to be described in greater detail hereinafter.

The ladder networks 82 and 84 are preferably coupled in parallel through a source of reference potential 86 which is illustratively shown as comprising an AC source, although a DC source can be utilized, whose function is to maintain the read-only memory 68 and 70 in the operating condition, which is preferably the only condition in which the read-only memory provides an output, as will be described in greater detail hereinafter. The sine function output of the read-only memory 68 is preferably provided via a path 88 to a high gain operational amplifier 90 which provides the quarter cycle (0° to 90°) output via a path 92 and aids in maintaining the sine read-only memory 68 in the operating state in a manner to be described in greater detail hereinafter. Similarly, the cosine function output of the cosine read-only memory 70 is fed via a path 94 to another high gain operational amplifier 96 which provides the quarter cycle (0° to 90°) cosine function output via a path 98 and aids in maintaining the cosine read-only memory 70 in the operating state in a manner to be described in greater detail hereinafter.

The quarter cycle sine function output on path 92 and the quarter cycle cosine output on path 98 of the digital-to-synchro quarter cycle (0° to 90°) convertor 64 are connected to the quadrant selection portion 66. The quarter cycle sine function output via path 92 is connected through an amplifier 100 to a primary winding 102 of a transformer 104 having a center-tapped secondary winding 106. Similarly, the quarter cycle cosine function output via path 98 is connected through an amplifier 108 to a primary winding 110 of a transformer 112 having a center-tapped secondary winding 114. The outputs of the respective secondary windings 106 and 114 are, respectively, connected to the inputs of a conventional 2-out-of-8 multiplexer 116.

The multiplexer 116 preferably has four inputs relating to the sine function 118, 120, 122, and 124, and four inputs relating to the cosine function 126, 128, 130, and 132. The multiplexer 116 also receives two quadrant select bits via path 134 and 136 from the ten bit ICAO code digital parallel input signal. Each of the inputs 118 through 132 inclusive is associated with a switch (not shown) which is enabled in accordance with the bit condition of the quadrant select bits present on the paths 134 and 136. Since the digital input of the preferred embodiment, is an ICAO code input, which is a modified Gray code in which the $D_4$ bit and the $A_1$ bit are out of phase with a normal two bit binary count with respect to the third and fourth counts (normal two bit binary count is 0–0; 0–1; 1–0; 1–1; whereas Gray code two bit count is 0–0; 0–1; 1–1; and 1–0) the secondary windings 106 and 114 are connected so as to correct for this phase shift. Secondary winding 106 is in proper phase with the 0 radians output end connected in parallel to inputs 118 and 120 and the $\pi$ radians output end connected in parallel to inputs 122 and 124. However, the secondary winding 114 output is normally out of proper phase and the 0 radians output end is therefor connected in parallel with inputs 126 and 130 while the $\pi$ radians output end is connected in parallel with inputs 128 and 132.

The sine function output of the multiplexer 116 which is selected by switches 118 through 124 is fed via path 138 through a unity gain buffer amplifier 140 to provide a full cycle sine function output (0° to 360°) of the synchro shaft angle representative of the altitude digital input via path 141, which function is represented by the expression sine $\theta$, where $\theta$ represents this shaft angle. The cosine function output of the multiplexer 116 which is selected by switches 126 through 132, is fed via path 142 through a unity gain buffer amplifier 144 which provides a full cycle cosine function output (0° to 360°) of the synchro shaft angle representative of the altitude digital input via path 145, which function is represented by the expression cosine $\theta$, where $\theta$ represents this shaft angle. These full cycle output signals sine $\theta$ via path 141, and cosine $\theta$ via path 145 are fed to the resolver 14 for further processing in a manner to be described in greater detail hereinafter.

"DIGITAL-TO-SYNCHRO QUARTER CYCLE CONVERTOR"

Referring once again to FIG. 3 and now describing the read-only memory-ladder network portion in greater detail. For purposes of illustration only, the cosine read-only memory-ladder network 70 – 84 will be described, the sine read-only memory-ladder network 68 – 82 and manner of operation preferably being identical therewith with the exception that a sine function matrix instead of a cosine function matrix is provided in the read-only memory so as to program it to perform the sine function in place of the cosine function. The cosine function matrix input portion 72 is a conventional matrix array program wired to provide a cosine function of a digital input signal and will not be described or shown in greater detail hereinafter. As was previously mentioned, the read-only memory 70 is preferably an MOS device. Such MOS devices have some fixed value resistance which can be compensated for if desired in the ladder network 84. Such compensating resistance has been omitted in FIG. 3 for purposes of clarity.

Preferably, each of the output sections 76 of the output portion 74 is identical and only one such section will be described in greater detail for purposes of explanation The output section 76 includes a pair of field effect transistors (FET) 78 and 80, FET transistor 78 having a source electrode 146, a gate electrode 148, and a drain electrode 150 and FET transistor 180 including a source electrode 152, a gate electrode 154 and a drain electrode 156. As was previously mentioned, FET transistors 78 and 80 are serially connected together in synch-source relationship, with the drain electrode 150 of transistor 78 coupled to the source electrode 152 of transistor 80 at a coupling junction 158. The source electrode 146 of transistor 78 is connected to ground whereas the drain electrode 156 of transistor 80 is coupled via path 88 to the high gain operational amplifier 96 input. As shown and preferred in FIG. 3, the respective uncoupled source electrode 146 of each synch-source FET transistor pair 78–80 is connected in parallel to ground via path 160 and the uncoupled drain electrode 156 of each of these FET pairs 78–80 is connected in parallel to output path 88. The conventional R–2R ladder network 84 has a 2R branch 162 connected to each coupling junction 158 and an R linking branch 164 having an impedance value which is preferably approximately half the value of the 2R branch 162. The ladder network 84 is connected to ground through another 2R branch 162.

By way of illustration, diode protection devices 166 are shown as being connected in parallel to the drain electrodes 150 and 156 of each transistor pair 78–80 for protecting the MOS memory 70, and specifically the output portion 74 thereof, against voltage surges. These protection devices are normally provided with read-only memories having field-effect output transistors to prevent these memories from exceeding their given rated potential at the input. If these diode protection devices 166 are forward biased to the point of conduction no output will be provided from the read-only memory. This is termed the protection state of the memory. When the read-only memory is in the protection state, even if a digital input is received, this input will be shorted to ground, whereby no output is provided.

The source of reference potential 86 which is connected to the ladder network 84 is preferably chosen to be a value less than the forward bias potential of the protection devices 166 so that the read-only memory will remain in the operating state, which is the state in which an output can be produced, for all time. Typically, the value of this reference potential for most read-only memories is 3 to 5 volts RMS for a ladder network where R is approximately 50,000 ohms and 2R is approximately 99,500 ohms. This reference potential which is fed through the ladder network 84, maintains the sources and drains of the output field effect transistors at a potential close to the substrate voltage of the MOS memory which insures that the drain-to-substrate and source-to-substrate junctions will not be forward biased, as well as preventing the protection devices 166 from being forward biased to the point of conduction.

"CONDITION RESPONSIVE ALERT LOGIC NETWORK"

Now referring to FIG. 4 and describing in detail the condition responsive alert logic network 24 which receives the outer alert control signal via path 170, arm control signal via path 172, the reset-and-inhibit signal via path 174, and the inner alert control signal via path 176 to provide the altitude alert signaling conditions. As shown and preferred in FIG. 4, the logic network 24 includes three Diode-Transistor-Logic (DTL) NAND gate set-reset flip-flops 180, 182 and 184 respectively. Each flip-flop 180, 182 and 184 includes a pair of set-reset NAND gates 186 and 188 for flip-flop 180, 190 and 192 for flip-flop 182, and 194 and 196 for flip-flop 184, connected in a standard flip-flop configuration with gates 186, 190, and 194 being set gates and 188, 192 and 196 being reset gates. A capacitor 198 is preferably connected in parallel to the reset-and-inhibit signal path 174 in order to provide a tendency in the flip-flops 180, 182 and 184 to lean to a reset position rather than a set position.

The inner alert control signal path 176 and the arm control signal path 172 are connected as inputs to a NAND gate 200 whose output is connected as one input to another four input NAND gate 202. Arm signal path 172 is also connected in parallel with another input to this NAND gate 202 while the fourth input to the NAND gate 202 is provided from NAND gate 190 of flip-flop 182. Inhibit signal 174 is connected in parallel to the input of NAND gate 202 with the output of NAND gate 200, as well as with an input to NAND gate 190 of flip-flop 182. The outer alert signal path 170 is also connected in parallel to an input of NAND gate 190 which has another input provided by the output of NAND gate 192 of the flip-flop 182. NAND gate 192 has its inputs connected respectively to the output of NAND gate 190 of flip-flop 182, the input to NAND gate 188 of flip-flop 180, and an input of NAND gate 196 of flip-flop 184. The output of NAND gate 202 is connected in parallel to an input to NAND gate 186 of flip-flop 180 and an input to NAND gate 194 of flip-flop 184. The other inputs to NAND gates 186 and 194 is provided by the outputs of NAND gates 188 and 196, respectively. The reset-and-inhibit signal path 174 is further connected in parallel to another input to NAND gate 188 and NAND gate 196, respectively, flip-flops 180 and 182 are connected in parallel via path 203 and a buffer amplifier 205 to one input of the alert lamp network 58 and flip-flops 182 and 184 are connected in parallel via path 207 and buffer amplifier 209 to the other input of the alert lamp network 58. The alert lamp network 58, if desired, can contain two separate and distinct lamp visual alarms, one triggered via path 203 and the other via path 207. If the alert lamp network 58 contains only one lamp visual alarm then, if desired, either flip-flop 180 or 184 may be omitted with the remaining flip-flop triggering the lamp 58 in conjunction with flip-flop 180.

"SINGLE-SHOT NETWORK"

The output of NAND gate 186 of flip-flop 180 is further connected in parallel to a diode 204 of a single-shot integrated circuit monostable network 206. The diode 204 is coupled back-to-back with another diode 208 whose input is coupled in parallel to the output of NAND gate 194 of flip-flop 184. This back-to-back coupled diode pair 204 and 208 is connected in parallel to a capacitor charging network 211 including impedance 210 and capacitor 212, where capacitor 212 and impedance 210 determine the time constant of the charging network. Another diode 214 is connected in parallel with the capacitor charging network 211 capacitor 212 to provide a discharge path for the capacitor 212. An operational amplifier 216 is provided which has a pair of inputs 218 and 220 having associated potentials $V_2$ and $V_1$, respectively. The input 220 is connected in parallel to the R-C charging network 210–212 and the diode 214, while input 218 is connected in parallel through an impedance 222 to a source of positive charging potential V+, and through impedance 224 to ground. The output of the single-shot 206 operational amplifier 216 is fed via path 230 through the aural alert buzzer 62 for intermittently triggering the operation thereof when a signal is present at the output of the operational amplifier 222.

"OPERATION"

Now describing the operation of the alerter 10 when a ten bit ICAO code altitude digital input signal is received. The eight least significant bits of the ten bit ICAO code which contains the quarter cycle angular information are fed in parallel to the inputs of the sine read-only memory 68 and cosine read-only memory 70, respectively. The two most significant bits of the ten bit ICAO code input, which are the quadrant location or select bits, are fed via paths 134 and 136 to the multiplexer 116 to control the quadrant selection function of the multiplexer to be described in greater detail hereinafter. The R–2R ladder networks 82 and 84, which have the 2R branches 162 thereof connected to the source-drain coupling junctions 158 or the output sections 76 of the read-only memories 68 and 70, performs the binary scaling functions for the sine and cosine digital outputs of the sine and cosine function matrices of the read-only memories 68 and 70, respectively.

Each FET transistor pair 78–80 is an FET bistable switch with transistor 80 representing the Q state of the bistable switch and transistor 78 representing the $\overline{Q}$ state of the FET switch. When transistor 80 is ON and transistor 78 is OFF, which represents the logic 1 state, the output signal present at the junction 158 is summed into the respective summing junctions 91 and 95 of the operational amplifier summing means 90 and 96, respectively. When transistor 78 is ON and transistor 80 is OFF, which represents the logic 0 state, the output of the transistor switch 78–80 is effectively grounded. This switching function determines which branches of the R–2R ladder network 82 and 84 are connected to the summing junctions 91 and 95, respectively and, therefore, determines the analog output of the respective read-only memories 68 and 70. This output signal which is present at the uncoupled drain electrodes 56 of the respective read-only memories 68 and 70, on paths 88 and 94 respectively, is a current whose magnitude is dependent on the ladder impedance of the associated ladder network AD2 and AD9, respectively, and the applied reference potential from source 86. This output signal is summed at summing junctions 91 and 95, respectively, to provide an analog sinusoidal function output signal on paths 92 and 98 which is a voltage divided output signal having a magnitude equal to the applied reference potential multiplied by the ratio of the equivalent binary scaling impedance of the eight bit binary number present at the output of the memory divided by the total impedance of the respective ladder network. The high gain amplifier summing networks 90 and 96 maintain the drain potential ($Vdd$) substantially close to 0 while accomplishing the conversion of the output signals, which are currents, to voltage signals so that the substrate will not be forward biased to the protection state.

These output voltage signals represent, respectively, an analog function which is the sine of a binary number from memory 68, and another analog function which is the cosine of the same binary number from memory 70. These sine and cosine quarter cycle (0° to 90°) functions are in turn fed to the multiplexer 116 via transformers 104 and 112. The sine function signal which is provided from the center tapped secondary winding 106 is a full cycle (0° to 360°) signal, where each quadrant is represented by one of the switch inputs 118 through 124 inclusive, the proper switch 118 through 124 or quadrant being selected in accordance with the bit condition of the two bit binary quadrant select input via paths 134 and 136 [0–0 corresponding to the first quadrant (0° to 90°); 0–1 corresponding to the second quadrant (90° to 180°); 1–0 corresponding to the third quadrant (180° to 270°); and 1–1 corresponding to the fourth quadrant (270° to 360°)]. Similarly, for the cosine function signal present at the primary winding 110 which is fed to the center tapped secondary winding 114 of the transformer 112, where the proper quadrant is selected by selecting the correct switch 126 to 132 inclusive in accordance with the bit condition of the quadrant select bits 134 and 136. These quadrant select bits 134 and 136 are fed in parallel to the sine select switch group 118 through 124 and the cosine select switch group 126 through 132 so that the sine and cosine functions present on paths 138 and 142 are functions of the same full cycle angle which is the synchro equivalent of the altitude digital input. These two outputs are fed through the inverting-noninverting buffer amplifiers 140 and 144, respectively, to provide the sinusoidal functions sine $\theta$ and cosine $\theta$ which represent the synchro shaft angle equivalent of the digital altitude input signal.

These sine and cosine voltages are then fed into the resolver 14 whose output is equal to the difference between the shaft angle and the applied input angle, where the input angle $\theta$ is the equivalent synchro shaft angle of the altitude digital input and the resolver shaft angle is represented by $\beta$. The output voltages of the resolver on paths 23 and 25 are voltages which are proportional to the sinusoidal functions sine $(\theta-\beta)$ and cosine $(\theta-\beta)$, respectively. The output signal sine $(\theta-\beta)$ of the resolver 14 is phase demodulated as is the resolver output signal cosine $(\theta-\beta)$. The phase demodulated cosine $(\theta-\beta)$ output signal is the arming control signal which is fed to the condition responsive alert logic network 24, whose operation will be described in greater detail hereinafter. The cosine $(\theta-\beta)$ output of the resolver 14 is also fed in parallel through the precision rectifier 26 to the barometric potentiometer 30 which shifts the null point of the comparator logic to correspond to the barometrically corrected new altitude. The relative magnitude of the demodulated sine $(\theta-\beta)$ signal is summed with the relative magnitude of the scaled barometrically corrected cosine $(\theta-\beta)$ signal in summing amplifier 42 to provide an alert control signal proportional to the sinusoidal input signals cosine $(\theta-\beta)$ and demodulated sine $(\theta-\beta)$. The output of this summing amplifier 42 is converted to a positive voltage by the absolute value amplifier 44 which feeds the comparators or voltage detectors 46 and 48, which effectively compare these relative magnitudes to provide a logic 1 or 0 condition. The threshold voltage of these comparators 46 and 48, which determines the switch point at which the logic 1 or 0 occurs, is determined by the potentiometer reference voltages associated with the potentiometers 50 and 52, respectively. The output of these voltage detectors or comparators 46 and 48 supplies the outer and inner level alert logic signals, respectively, via paths 170 and 176 for the condition responsive logic network 24. If desired, the sine $(\theta-\beta)$ output signal may be summed directly with the baro-corrected rectified cosine $(\theta-\beta)$ signal.

The altitude alerting apparatus of the present invention preferably has a deviate mode and an approach mode. The approach mode is provided when the aircraft is approaching a new assigned altitude from an old assigned or preselected altitude or during takeoff while approaching the assigned altitude, and the deviate mode is provided for once the aircraft has reached its assigned selected altitude. In the approach mode it is desirable to know when the outer limit or the altitude envelope has been reached, and when the inner limit of the altitude envelope has been reached. In the deviate mode it is desirable to know when the aircraft has strayed or deviated, beyond the inner limit of the altitude envelope, and when the aircraft has strayed beyond the outer limit of the altitude envelope, as well as when it has returned within the inner limits of the envelope once again. By way of example, a typical altitude alerting sequence in which such indications are provided is shown graphically in FIG. 5.

Referring now to FIGS. 4 and 5, in order to explain by way of example, how the condition responsive alert logic network 24 operates to provide alerting indications. For purposes of illustration, we shall assume that the point at which the arming signal is generated is just before the worst case outer limit point as the aircraft approaches from above or below the selected altitude. The function of the arming point signal is to prevent signal cycle ambiguity of the logic when a synchro type sinusoidal alert control signal is utilized. The arming point is therefor preferably chosen as being equal to one half the equivalent recycle point of the synchro.

For purpose of illustration we shall describe the operation of the circuit for an aircraft 500 initially approaching a new selected altitude SA from above, the operation of the circuit if the selected altitude SA is initially approached from below being identical as the altitude envelope is symmetrical about the selected altitude SA. For purposes of explanation a 1 represents a signal being present or ON, and a 0 represents a signal being OFF. As the aircraft 500 approaches the selected altitude SA from beyond the altitude envelope, whose limits are determined by the outer limits $OL_u$ and $OL_1$, but is still above the arming point AP, such as represented by the position 501, the arming signal is OFF, the inner alert control signal is OFF and the outer alert control signal is OFF and no output is provided from NAND gates 200 or 202. Where the arming point AP is reached at position 502, the arming signal is present. No inner or outer alert control signals are present, however, to provide an 0 output from NAND gate 200, and flip-flops 180, 182 and 184 are not set and no alert indication is therefore provided.

As the aircraft 500 continues to position 503, which is between the outer limit $OL_u$ and the inner limit $IL_u$, the arming signal is still present, no inner alert control signal is present, but an outer alert control signal is present. This condition provides an output from NAND gate 202 to set flip-flops 180 and 184 which back biases the diodes 204 and 208 (diodes 204 and 208 go high) applying the charging potential V+ to capacitor 212 and causing capacitor 212 to charge through impedance 210. While the capacitor 212 is charging, the potential $V_1$ associated with the input 220 is greater than the potential of $V_2$ associated with input 218 and an output $V_3$ is provided from the operational amplifier 216. This output in turn is passed to the aural alert buzzer circuit 62 which is thereby triggered to emit a sound alarm along with the lights coming on. The duration of the sound alarm is determined by the time constant R–C 210–212 of the charging network 209. When the capacitor 212 if fully charged, $V_1$ becomes less than $V_2$ and the operational amplifier 216 goes OFF thereby ceasing the operation of the aural alert buzzer 62. When either of the diodes 204 or 208 go low (logic), capacitor 212 does not charge and no aural alert is provided. After capacitor 212 is fully charged, and either diode 204 or 208 go low, diode 220 discharges the capacitor 212 to ground. It should be noted that an aural alert is provided only when the lights are first turned ON. The set output of flip-flops 180 and 184 also provides a signal which turns ON the alert lamp 58.

As the aircraft 500 continues approaching the selected altitude SA and reaches the inner limit $IL_u$ at position 504, the arming signal is present, the inner alert control signal is present, and the outer alert control signal is present. This logic input condition resets flip-flops 180 and 184 and cancels the signal to the alert lamp 58, extinguishing the alert lamp 58, and automatically reverts the apparatus to the deviate mode. This logic condition continues to exist when the aircraft 500 is between the inner limit $IL_u$ and the selected altitude SA, at position 505, at the selected altitude at position 506, and once again at the lower inner limit $IL_1$, at position 508.

As the aircraft 500 continues to proceed, with the logic 24 now in the deviate mode, to a position 510 between the inner limit $IL_1$ and the outer limit $OL_1$, the inner limit signal is present but the outer limit signal is not. This sets flip-flops 180 and 184 which provides an output signal to the single-shot 206 which causes the emission of a sound alarm for the duration of the time constant of the charging network 210-212 and turns ON the alert lamp 58. This lamp 58 will remain on in the deviate mode until the alert has manually been cancelled by a switch (not shown) or the aircraft 500 returns once again within the inner limit at position 512. The aircraft 500 remains in this deviate mode, until a new selected altitude SA is selected by rotation of the altitude select knob 16. In this deviate mode, each time the aircraft 500 deviates beyond the inner limit $IL_u$ or $IL_1$ the intermittent sound alarm is heard and the alert lamp 58 goes ON and remains ON until the aircraft 500 returns within the inner limits or the alert is manually cancelled.

The alert logic conditions present on paths 170 (outer limit), 172 (arm) and 176 (inner limit) can be summarized by the following table where 1 represents the signal being present or ON and a 0 represents a signal being OFF.

| Aircraft Location | Arm | Inner | Outer |
|---|---|---|---|
| Greater than arming point | 0 | 0 | 0 |
| Less than arming point and greater than outer limit | 1 | 0 | 0 |
| Less than the outer limit but greater than inner limit | 1 | 0 | 1 |
| Less than or equal to the inner limit | 1 | 1 | 1 |

As shown in FIG. 1, generator 54 and reset and inhibit circuit 56 provide a reset-and-inhibit signal to the logic network 24 on path 174 which pulls down the input of NAND gate 202 thereby inhibiting all logic transfer when this signal is present, and subsequently pulls down the reset inputs 188, 190 and 196 of the flip-flops 180, 182 and 184 thereby resetting them into the approach mode with the alert lamps extinquished. The reset-and-inhibit signal is generated by means of generator 54 which is preferably geared to the rotation of the altitude select knob 16 to generate this signal during the rotation of the knob 16. This signal is amplified and rectified and fed to the base of a high-gain transistor (not shown) in the reset-and-inhibit circuit 56 to derive the reset-and-inhibit signal. The generator 54 reset-and-inhibit circuit 56 can be any conventional synchro mechanism-amplifier network capable of providing a signal which pulls down the input of NAND gates 202, 188, 190 and 196.

By utilizing the altitude alerting apparatus of the present invention, the conventional digital altitude reporting code, such as the commonly used ICAO altitude reporting code can simply and easily be utilized to provide indications or alerts of variations of an aircraft from a given preselected altitude. Such altitude variations will be provided substantially without errors due to phase differences which may occur when a synchro signal is utilized to control an altitude alerting network. Furthermore, by utilizing the digital-to-synchro convertor of the present invention, conversion of a digital input signal to a synchro signal is accomplished in an economical and efficient manner.

It is to be understood that the above described embodiment of the present invention is merely illustrative thereof and numerous modifications and embodiments of the invention may be derived within the spirit and scope thereof.

What is claimed is:

1. Altitude altering apparatus for providing an indication of altitude variation about a preselected altitude in response to a coded altitude information input signal, said apparatus comprising:
   a. conversion means responsive to said input signal for providing a first pair of complementary sinusoidal signals, said conversion means comprising read-only memory means having an input portion and an output portion, said input portion coupled to receive said input signal and being programmed to provide one of said first pair of sinusoidal signals as a function of said input signal;
   b. resolver means for receiving said first pair of sinusoidal signals and an input indicative of the preselected altitude and for providing a second pair of complementary sinusoidal signals; and
   c. indication means responsive to said second pair of complementary, sinusoidal signals for providing an indication of the variation of the sensed altitude as indicated by said input signal from the preselected altitude.

2. An apparatus in accordance with claim 1 wherein said read only-memory means has an operating state and a protection state, no output being provided from said output portion when said memory means is in said protection state, said output portion being capable of providing said one of said first sinusoidal pair when said read-only memory means is in said operating state, and said conversion means further includes means for maintaining said read-only memory means in said operating state, said maintaining means being operatively connected to said output portion.

3. An apparatus in accordance with claim 2 wherein said read-only memory means includes protection means having a conduction state and a non-conduction state, said protection means being operatively connected to said output portion, said read-only memory means being in said operating state when said protection means is in said non-conduction state and in said protection state when said protection means is in said conduction state, said maintaining means maintaining said protection means in said non-conduction state.

4. An apparatus in accordance with claim 1 wherein said conversion means includes binary scaling means operatively connected to said output portion, the input of said conversion means being an analog signal proportional to said input signal, said scaling means scaling said input signal to provide said analog signal.

5. An apparatus in accordance with claim 4 wherein said binary scaling means comprises an R–2R impedance ladder network 6. An apparatus in accordance with claim 4 wherein said read-only memory means has an operating state and a protection state, no output being provided from said output portion when said memory means is in said protection state, said output portion being capable of providing said one of said first sinusoidal pair when said read-only memory means is in said operating state; and said conversion means further includes means for maintaining said read-only memory means in said operating state, said maintaining means being operatively connected to said scaling means, said scaling means being operatively connected between said output portion and said maintaining means.

7. An apparatus in accordance with claim 4 wherein said read-only memory means has a substantially constant value impedance, and said scaling means includes means for compensating for said memory means impedance.

8. An apparatus in accordance with claim 6 wherein said read-only memory means includes protection means having a conduction state and a non-conduction state, said protection means being operatively connected to said output portion, said read-only memory means being in said operating state when said protection means is in said non-conduction state and in said protection state when said protection means is in said conduction state, said maintaining means maintaining said protection means in said non-conduction state.

9. An apparatus in accordance with claim 8 wherein said maintaining means includes a source of reference potential for applying said reference potential to said scaling means, said conduction state occurring at an associated applied potential value, said reference potential value being less than the potential value associated with said conduction state, whereby said non-conduction state is maintained.

10. An apparatus in accordance with claim 9 wherein said output portion includes bistable switching means having a first and a second state, said bistable switching means providing said analog signal therefrom in said first state, said bistable means including a serially coupled push-pull pair of field effect transistors each having a source electrode, a drain electrode and a gate electrode with the source electrode of one transistor of said transistor pair being coupled to the drain electrode of the other transistor of said transistor pair, the uncoupled source electrode of the other transistor being connected to ground, the uncoupled drain electrode of said one transistor pair providing said analog signal in said first state, and said scaling means is operatively connected to said source-drain electrode couple.

11. An apparatus in accordance with claim 6 wherein said scaling means comprises an impedance means, and said maintaining means includes a source of reference potential for applying said reference potential to said scaling means, said protection state occurring at an associated applied potential value, said reference potential value being less than the potential value associated with said protection state, said analog signal having a magnitude proportional to said scaling means impedance and said applied reference potential.

12. An apparatus in accordance with claim 11 wherein said apparatus further includes summing means having an input and an output, said summing means input being operatively connected to said output portion, said scaling means having a total impedance value and a scaled impedance value equivalent to a binary equivalent of said digital input, said summing means output being said analog signal, said summing means output having a magnitude proportional to said applied reference potential and a ratio of said scaling means scaled impedance to said scaling means total impedance.

13. An apparatus in accordance with claim 11 wherein said apparatus further includes summing means having an input and an output, said summing means input being operatively connected to said output portion, said scaling means having a total impedance value and a scaled impedance value equivalent to a binary equivalent of said digital input, said summing means output being said analog signal, said summing means output having a magnitude proportional to said applied reference potential and a ratio of said scaling means scaled impedance to said scaling means total impedance, said summing means being a high gain operational amplifier means, said output portion includes bistable switching means having a first and a second state, said bistable means providing said analog signal therefrom in said first stage, said bistable means including a serially coupled push-pull pair of field effect transistors each having a source electrode, a drain electrode and a gate electrode with the source electrode of one transistor of said transistor pair being coupled to the drain electrode of the other transistor of said transistor pair, the uncoupled source electrode of the other transistor being connected to ground, the uncoupled drain electrode of said one transistor providing said analog signal in said first stage, said scaling means is operatively connected to said source-drain electrode couple, said read-only memory means is an MOS memory means having a substrate and an associated substrate potential, said summing means input being operatively connected to said uncoupled drain electrode, and said applied reference potential maintaining said uncoupled source and drain electrodes at a potential close to said substrate potential, whereby said MOS means is maintained in said operating state.

14. An apparatus in accordance with claim 1 wherein said input signal is an ICAO coded signal.

15. An apparatus in accordance with claim 1 wherein said information signal comprises a plurality of bits, said plurality of bits including digital angular information bits and quadrant location bits, said angular information bits indicating a digital angular equivalent between 0° and 90° and said quadrant location bits including a quadrant of 360° in which said equivalent digital angle is located, and said conversion means provides said first pair of sinusoidal signals as a first set of analog sinusoidal functions of a digital angle between 0° and 360° as derived from said angular information and said quadrant location bits.

16. An apparatus in accordance with claim 15 wherein said conversion means includes first means for providing a second set of analog sinusoidal functions as functions of a digital angle between 0° and 90°, and second means for providing said first set of analog sinusoidal functions of said angle between 0° and 360° from said second set of sinusoidal functions of said angle between 0° and 90° and said quadrant locations bits, said second means including multiplexer switching means operatively connected to said first means for providing said first set of analog sinusoidal functions.

17. An apparatus in accordance with claim 16 wherein said second means includes a transformer means having a center-tapped secondary winding and a primary winding, said primary winding being operatively connected to an input of said multiplexer for providing said second set of sinusoidal functions as an input thereto, and said quadrant locations bits being provided as another input to said multiplexer.

18. An apparatus in accordance with claim 1 wherein indication means includes alert means for providing an inner limit alert point signal and an outer limit alert point signal corresponding respectively to first and second variations from the preselected altitude, the second variation being greater than the first variation, said indication means providing an indication in response to said inner alert point signal and to said outer alert point signal.

19. An apparatus in accordance with claim 18 wherein said apparatus has a deviate mode and an approach mode, said indication means providing an indication of deviation away from said preselected altitude in said deviate mode and approach toward said preselected altitude in said approach mode.

20. An apparatus in accordance with claim 19 wherein said apparatus further includes means for changing said apparatus from said approach mode to said deviate mode when said inner alert point signal is approached from said outer alert point signal in said approach mode.

21. An apparatus in accordance with claim 18 wherein said first complementary sinusoidal signals are sine and cosine, respectively.

22. An apparatus in accordance with claim 18 wherein said indication means provides an aural-visual signal in response to said inner alert signal when the first variation is approached from said preselected altitude and a visual signal when the second variation is approached from the first variation.

23. An apparatus in accordance with claim 19 wherein said indication means comprises signal means for providing an aural signal and a visual signal at the second deviation when the second variation is approached in the direction from the first variation, and said indication means is deactuated and said apparatus is changed to said deviate mode at the first variation when the first variation is approached from the second variation.

24. An apparatus in accordance with claim 21 wherein
said conversion means provides said first pair of complementary sine and cosine signals representative of a given altitude variation, each of said representative sine and cosine signals having a relative magnitude at said given altitude variation, and there is further included
means for comparing the relative magnitudes of said representative sine and cosine signals for providing said altitude alert control signal.

25. An apparatus in accordance with claim 24 wherein there is included means for setting the first and second variations, said setting means operatively connected to said comparing means for providing the first and second variations as reference signals thereto.

26. An apparatus in accordance with claim 18 wherein said indication means includes condition responsive logic means operative in a first logic condition in response to said inner altitude alert control signal and in a second logic condition in response to said outer altitude alert control signal.

27. An apparatus in accordance with claim 26 wherein said apparatus includes means for providing an arming signal to said condition responsive logic means whereby said last mentioned means is operative in a third logic condition.

28. An apparatus in accordance with claim 27 wherein said condition responsive logic means includes bistable means having a set state and a reset state, a set signal being provided to said bistable means when said logic means is operative in said second logic condition, a visual indication signal being provided by said indication means when said bistable means is in its set state.

29. An apparatus in accordance with claim 27 wherein said apparatus has a deviate mode and an approach mode, said indication means providing an indication of deviation away from said preselected altitude in said deviate mode and of approach toward said preselected altitude in said approach mode, said apparatus further including means for changing said apparatus from said approach mode to said deviate mode when said first variation is approached from said second variation in said approach mode, and said condition responsive logic means includes bistable means having a set state and a reset state, a visual indication signal being provided by said indication means when said bistable means is in its set state and being terminated when said bistable means is in its reset state, said condition responsive logic means being operative connected to said mode changing means, a reset signal being provided to said bistable means when said logic means is operative in said first and third logic conditions and said apparatus is in said approach mode for resetting said bistable means and changing said indication means to said deviate mode.

30. An apparatus in accordance with claim 26 wherein said apparatus has a deviate mode and an approach mode, said indication means providing an indication of deviation away from said preselected altitude in said deviate mode and of approach toward said preselected altitude in said approach mode, said condition responsive logic means includes bistable means having a set state and a reset state, said indication means is responsive to a presence of a successive pair of said first logic conditions in said deviate mode, said bistable means being set when logic means is first disposed in said successive pair of first logic conditions and reset when said logic means is disposed in the second of said successive pair of first logic conditions, and a visual indication signal is provided by said indication means when said bistable means is in its set state, said indication signal being cancelled when said bistable means is in said reset state.

31. An apparatus in accordance with claim 19 further including means for selecting a desired preselected altitude from a plurality of altitudes, said selecting means including means for providing said approach mode when said desired altitude selection occurs.

32. An apparatus in accordance with an 26 wherein said apparatus has a deviate mode and a approach mode, said indication means providing an indication of deviation away from said preselected altitude in said deviate mode and of approach toward said preselected altitude in said approach mode, said apparatus further including means for selecting a desired preselected altitude from a plurality of altitudes, said selecting means including means for inhibiting said logic means when said desired altitude selection occurs, said approach mode being provided when said logic means is inhibited.

* * * * *